US011754413B2

(12) United States Patent
Onodera et al.

(10) Patent No.: US 11,754,413 B2
(45) Date of Patent: Sep. 12, 2023

(54) PATH SETTING APPARATUS, PATH SETTING METHOD, AND STORAGE MEDIUM (71) Applicant: HONDA MOTOR CO., LTD., Tokyo (JP)

(72) Inventors: Satoshi Onodera, Tokyo (JP); Masamitsu Tsuchiya, Wako (JP); Hideki Matsunaga, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 261 days.

(21) Appl. No.: 16/824,030

(22) Filed: Mar. 19, 2020

(65) Prior Publication Data
US 2020/0309553 A1 Oct. 1, 2020

(30) Foreign Application Priority Data

Mar. 29, 2019 (JP) ................. 2019-067127

(51) Int. Cl.
G01C 21/36 (2006.01)
G05D 1/00 (2006.01)
B60W 10/20 (2006.01)

(52) U.S. Cl.
CPC .......... *G01C 21/362* (2013.01); *B60W 10/20* (2013.01); *G05D 1/0022* (2013.01); *G05D 1/0027* (2013.01); *B60W 2556/50* (2020.02); *G05D 2201/0213* (2013.01)

(58) Field of Classification Search
CPC . G01C 21/362; G01C 21/3461; B60W 10/20; B60W 2556/50; B60W 2556/20; B60W 2556/45; B60W 60/0059; G05D 1/0022; G05D 1/0027; G05D 2201/0213; G05D 1/0217; G05D 1/0038; G05D 1/0253; G05D 1/0223; G05D 1/0257; G05D 1/0276; G05D 1/0278; G05D 2201/0212
See application file for complete search history.

(56) References Cited

U.S. PATENT DOCUMENTS

2016/0252350 A1* 9/2016 Wharton ................. G01S 19/39 701/25
2017/0192437 A1* 7/2017 Bier ...................... G05D 1/0077
2021/0293562 A1* 9/2021 Bang ................... B60W 60/001

FOREIGN PATENT DOCUMENTS

| JP | 2009-042106 A | 2/2009 |
| JP | 2013-115803 A | 6/2013 |
| JP | 2017-167625 A | 9/2017 |
| JP | 2018-077652 A | 5/2018 |

OTHER PUBLICATIONS

Japanese Office Action for Japanese Patent Application No. 2019-067127 dated Nov. 18, 2022 (partially translated).

* cited by examiner

*Primary Examiner* — Jess Whittington
*Assistant Examiner* — Brian E Yang
(74) *Attorney, Agent, or Firm* — Thomas | Horstemeyer, LLP

(57) ABSTRACT

A path setting apparatus that sets a path of a mobile body having a plurality of operation modes is provided. The apparatus includes a quality acquisition unit configured to acquire communication qualities at a plurality of geographical locations, and a setting unit configured to set a path of the mobile body so as to pass through an area that satisfies a requirement of communication quality that is determined according to an operation mode of the mobile body.

6 Claims, 8 Drawing Sheets

| 501 | 502 | 503 | 504 |
|---|---|---|---|
| FUNCTION | REQUIRED QUALITY | ESSENTIAL DATA ITEM | AUXILIARY DATA ITEM |
| REMOTE DRIVING FUNCTION (HIGHWAY, LEADING MODE) | HIGH QUALITY | VEHICLE, FORWARD, OPERATION INSTRUCTION | RIGHT/LEFT, BACKWARD, INFRASTRUCTURE |
| REMOTE DRIVING FUNCTION (ORDINARY ROAD, LEADING MODE) | HIGH QUALITY | VEHICLE, ALL DIRECTIONS, OPERATION INSTRUCTION | INFRASTRUCTURE |
| REMOTE DRIVING FUNCTION (HIGHWAY, ASSIST MODE) | INTERMEDIATE QUALITY | VEHICLE, FORWARD, OPERATION INSTRUCTION | RIGHT/LEFT, BACKWARD, INFRASTRUCTURE |
| REMOTE DRIVING FUNCTION (ORDINARY ROAD, ASSIST MODE) | INTERMEDIATE QUALITY | VEHICLE, ALL DIRECTIONS, OPERATION INSTRUCTION | INFRASTRUCTURE |
| AUTOMATED DRIVING FUNCTION | INTERMEDIATE QUALITY | INFRASTRUCTURE | NONE |
| IVI FUNCTION | LOW QUALITY | MOVING IMAGE, MUSIC | NONE |
| MANUAL DRIVING FUNCTION | NONE | NONE | INFRASTRUCTURE |

PATH SETTING APPARATUS, PATH SETTING METHOD, AND STORAGE MEDIUM

CROSS-REFERENCE TO RELATED APPLICATION(S)

This application claims priority to and the benefit of Japanese Patent Application No. 2019-067127 filed on Mar. 29, 2019, the entire disclosure of which is incorporated herein by reference.

BACKGROUND OF THE INVENTION

Field of the Invention

The present invention relates to a path setting apparatus, a path setting method, and a storage medium.

Description of the Related Art

Remote driving techniques, also known as tele-operated driving techniques, in which a vehicle is operated by an operator located in a distant place are known. There is a demand for, in remote driving, sufficiently suppressing a delay in communication between an operator apparatus for an operator that executes remote driving and a user terminal mounted in a vehicle, along with other demands. In Japanese Patent Laid-Open No. 2013-115803, a communication amount is reduced by transmitting difference information of three-dimensional map data of the environment around a vehicle. Even if the amount of communication between an apparatus to be operated and a remote operation apparatus is reduced, the quality of communication between these apparatuses can decrease due to other causes (for example, congestion in the communication system). Depending on communication quality, a vehicle cannot execute a remote driving function and other functions satisfactorily. The same applies to not only vehicles but also other mobile bodies.

SUMMARY OF THE INVENTION

Some aspects of the present invention provide a technique for appropriately setting a path of a mobile body. According to some embodiments, a path setting apparatus that sets a path of a mobile body having a plurality of operation modes, the apparatus comprising: a quality acquisition unit configured to acquire communication qualities at a plurality of geographical locations; and a setting unit configured to set a path of the mobile body so as to pass through an area that satisfies a requirement of communication quality that is determined according to an operation mode of the mobile body is provided.

DESCRIPTION OF THE EMBODIMENTS

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Figure 1:
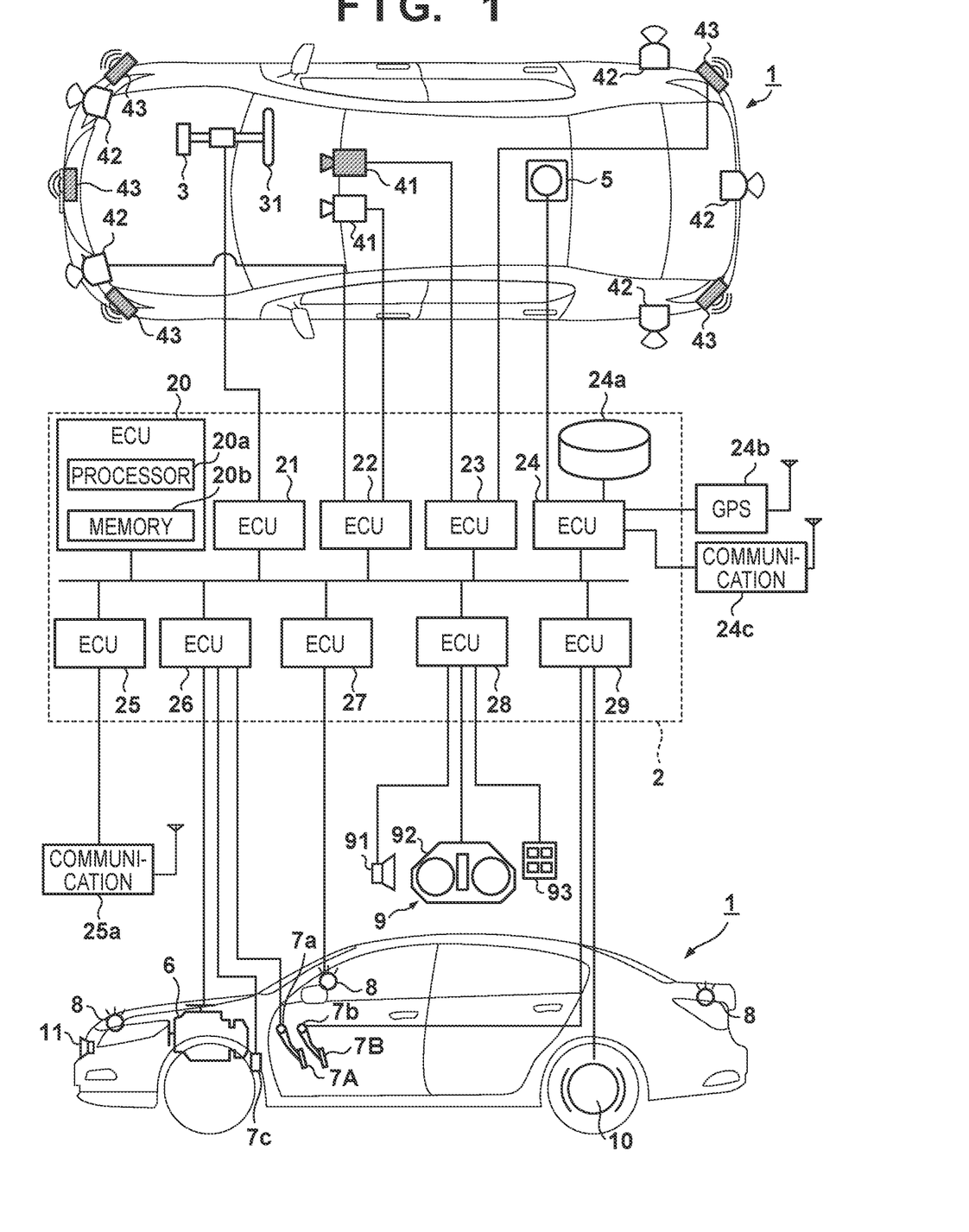
FIG. 1 is a block diagram illustrating a configuration example of a vehicle according to an embodiment of the present invention.

A vehicle 1 includes a vehicle control apparatus 2 (hereinafter, simply referred to as "control apparatus 2") that controls the vehicle 1. The control apparatus 2 includes a plurality of ECUs 20 to 29 that are communicably connected by an in-vehicle network. Each of the ECUs includes a processor represented by a CPU, a memory such as a semiconductor memory, an interface to an external device, and the like. The memory stores programs that are executed by the processor, data that is used by the processor to perform processing, and the like. Each of the ECUs may include a plurality of processors, memories, interfaces, and the like. For example, the ECU 20 includes a processor 20$a$ and a memory 20$b$. Processing that is performed by the ECU 20 is executed as a result of the processor 20$a$ executing an instruction included in a program stored in the memory 20$b$. Alternatively, the ECU 20 may include a dedicated integrated circuit such as an ASIC for executing processing that is performed by the ECU 20. The same applies to the other ECUs.

Functions allocated to the (respective) ECUs 20 to 29, and the like will be described below. Note that the number of ECUs and functions allocated to the ECUs can be designed as appropriate, and can be segmentalized further than those in this embodiment, or can be integrated.

The ECU 20 executes running control related to an automated driving function and a remote driving function of the vehicle 1. In this running control, the ECU 20 automatically controls steering and/or acceleration/deceleration of the vehicle 1. The automated driving function is a function of the ECU 20 planning a running route of the vehicle 1, and controlling steering and/or acceleration/deceleration of the vehicle 1 based on this running route. The remote driving function is a function of the ECU 20 controlling steering and/or acceleration/deceleration of the vehicle 1 in accordance with an instruction from an operator outside the vehicle 1. The operator outside the vehicle 1 may be a human or an AI (artificial intelligence). The ECU 20 can execute the automated driving function and the remote operation function in combination. For example, a configuration may also be adopted in which the ECU 20 plans a running route and performs running control when there is no instruction from an operator, and when there is an instruction from an operator, performs running control in accordance with the instruction.

The ECU 21 controls an electronic power steering apparatus 3. The electronic power steering apparatus 3 includes a mechanism for steering front wheels according to a driver's driving operation (steering operation) on a steering wheel 31. The electronic power steering apparatus 3 also includes a motor that exerts drive force for assisting a steering operation and automatically steering the front wheels, a sensor that detects a steering angle, and the like. When the driving state of the vehicle 1 is an automated driving state, the ECU 21 automatically controls the electronic power steering apparatus 3 according to an instruction from the ECU 20, and controls the direction of forward movement of the vehicle 1.

The ECUs 22 and 23 control detection units 41 to 43 that detect the situation of the outside of the vehicle, and perform information processing on detection results. Each detection unit 41 is a camera for shooting an image ahead of the vehicle 1 (which may hereinafter be referred to as "camera 41"), and, in this embodiment, is installed at a roof front part and on an interior side of the front window. By analyzing an image shot by a camera 41, it is possible to extract the contour of an object and a demarcation line (white line, for example) of a traffic lane on a road.

Each detection unit 42 is a LIDAR (Light Detection and Ranging, may hereinafter be referred to as "LIDAR 42"), detects an object in the surroundings of the vehicle 1, and measures the distance from the object. In this embodiment, five LIDARs 42 are provided, two of the five LIDARs 42 being provided at the respective front corners of the vehicle 1, one at the rear center, and two on the respective sides at the rear. Each detection unit 43 is a millimeter-wave radar (which may hereinafter be referred to as "radar 43"), detects an object in the surroundings of the vehicle 1, and measures the distance from a marker. In this embodiment, five radars 43 are provided, one of the radars 43 being provided at the front center of the vehicle 1, two at the respective front corners, and two at the rear corners.

The ECU 22 controls one camera 41 and the LIDARs 42, and performs information processing on their detection results. The ECU 23 controls the other camera 41 and the radars 43, and performs information processing on their detection results. By providing two sets of apparatuses that detect the surrounding situation of the vehicle, the reliability of detection results can be improved, and by providing detection units of different types such as cameras, LIDARs, and radars, the surrounding environment of the vehicle can be multilaterally analyzed.

The ECU 24 controls a gyro sensor 5, a GPS sensor 24*b*, and a communication apparatus 24*c*, and performs information processing on their detection results or communication results. The gyro sensor 5 detects rotary movement of the vehicle 1. A course of the vehicle 1 can be determined based on a detection result of the gyro sensor 5, a wheel speed, and the like. The GPS sensor 24*b* detects the current position of the vehicle 1. The communication apparatus 24*c* wirelessly communicates with a server that provides map information and traffic information, and acquires such information. The ECU 24 can access a database 24*a* of map information built in the memory, and the ECU 24 searches for a route from the current location to a destination, and the like. The ECU 24, the map database 24*a*, and the GPS sensor 24*b* constitute a so-called navigation apparatus.

The ECU 25 includes a communication apparatus 25*a* for inter-vehicle communication. The communication apparatus 25*a* wirelessly communicates with another vehicle in the surroundings thereof, and exchanges information with the vehicle. The communication apparatus 25*a* is also used for communication with an operator outside the vehicle 1.

The ECU 26 controls a power plant 6. The power plant 6 is a mechanism for outputting drive force for rotating the drive wheels of the vehicle 1, and includes an engine and a transmission, for example. For example, the ECU 26 controls output of the engine in accordance with a driver's driving operation (an accelerator operation or an accelerating operation) detected by an operation detection sensor 7*a* provided on an accelerator pedal 7A, and switches the gear stage of the transmission based on information regarding the vehicle speed detected by a vehicle speed sensor 7*c*. When the driving state of the vehicle 1 is an automated driving state, the ECU 26 automatically controls the power plant 6 in accordance with an instruction from the ECU 20, and controls the acceleration/deceleration of the vehicle 1.

The ECU 27 controls illumination apparatuses 8 (lights such as headlights and taillights) that include direction indicators (blinkers). In the example in FIG. 1, the illumination apparatuses 8 are provided on door mirrors, at the front, and at the rear of the vehicle 1. The ECU 27 further controls an acoustic apparatus 11 that includes a horn and is directed to the outside of the vehicle. The illumination apparatuses 8, the acoustic apparatus 11, or a combination thereof has a function of providing information to the outside the vehicle 1.

The ECU 28 controls an input/output apparatus 9. The input/output apparatus 9 outputs information to the driver, and receives information from the driver. An audio output apparatus 91 notifies the driver of information using sound. A display apparatus 92 notifies the driver of information through image display. The display apparatus 92 is installed in front of the driver's seat, for example, and constitutes an instrument panel, or the like. Note that, here, sound and display are illustrated, but information may be notified using vibration and light. In addition, information may also be notified using a combination of some of sound, display, vibration, and light. Furthermore, the combination or a notification aspect may be different according to the level of information to be notified (for example, an emergency level). Input apparatuses 93 are a group of switches arranged at positions so as to enable the driver to perform an operation on the switches to give an instruction to the vehicle 1, but may include an audio input apparatus. The ECU 28 can give guidance related to running control of the ECU 20. The guidance will be described later in detail. The input apparatuses 93 may also include a switch used for controlling an operation of running control by the ECU 20. The input apparatuses 93 may also include a camera for detecting the direction of a line of sight of the driver.

The ECU 29 controls a brake apparatus 10 and a parking brake (not illustrated). The brake apparatus 10 is, for example, a disk brake apparatus, is provided for each of the wheels of the vehicle 1, and decelerates or stops the vehicle 1 by imposing resistance to rotation of the wheels. The ECU 29 controls activation of the brake apparatus 10, for example, in accordance with a driver's driving operation (brake operation) detected by an operation detection sensor 7*b* provided on a brake pedal 7B. When the driving state of the vehicle 1 is an automated driving state, the ECU 29 automatically controls the brake apparatus 10 in accordance with an instruction from the ECU 20, and controls deceleration and stop of the vehicle 1. The brake apparatus 10 and the parking brake can also be activated to maintain a stopped state of the vehicle 1. In addition, if the transmission of the power plant 6 includes a parking lock mechanism, this can also be activated in order to maintain a stopped state of the vehicle 1.

A configuration of a remote driving apparatus 200 according to some embodiments of the present invention will be described with reference to the block diagram in FIG. 2. The remote driving apparatus 200 is an apparatus that provides a remote driving service to a vehicle that has a remote driving function. The remote driving apparatus 200 is positioned at a remote location from a vehicle to which the service is provided.

The remote driving apparatus 200 may be able to provide the remote driving service in a plurality of operation modes. The plurality of operation modes of the remote driving service may include a leading mode and an assisting mode. The leading mode refers to an operation mode in which the operator of the remote driving apparatus 200 specifies control amounts (for example, a steering angle, an accelerator pedal position, a brake pedal position, a position of the directional signal lever, and on/off of the lights) of the vehicle. The assisting mode refers to an operation mode in which the vehicle (specifically, the ECU 20) determines control amounts of the vehicle in accordance with a path plan specified by the operator of the remote driving apparatus 200. In the assisting mode, the operator of the remote driving apparatus 200 may generate and designate a path plan for themselves, or may adopt and designate a path plan suggested by the vehicle.

Figure 2:
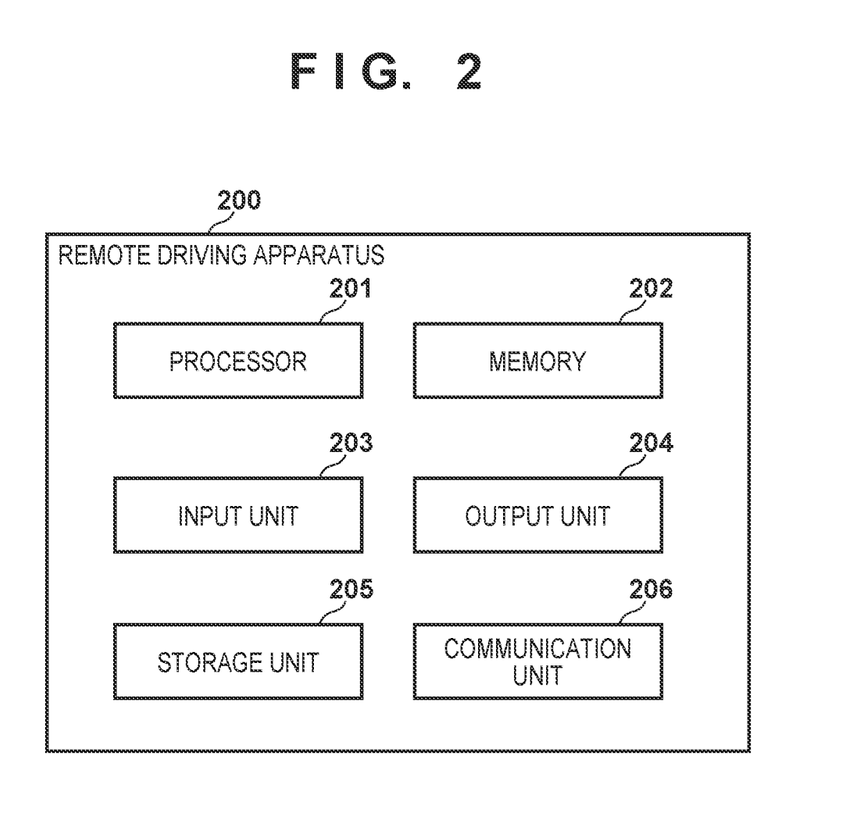
FIG. 2 is a block diagram illustrating a configuration example of a remote driving apparatus according to an embodiment of the present invention.

The remote driving apparatus 200 includes constituent elements shown in FIG. 2. A processor 201 controls overall operations of the remote driving apparatus 200. The processor 201 functions as a CPU, for example. A memory 202 stores programs that are used for operations of the remote driving apparatus 200, temporary data, and the like. The memory 202 is realized by a ROM and a RAM, for example. An input unit 203 is used by the user of the remote driving apparatus 200 to perform input to the remote driving apparatus 200. When a human operates the remote driving apparatus 200, the user of the remote driving apparatus 200 is this human, and when an AI operates the remote driving apparatus 200, the user of the remote driving apparatus 200 is a human (monitoring person) that monitors operations of the AI. An output unit 204 is used for outputting information from the remote driving apparatus 200 to the user. A storage unit 205 stores data used for operations of the remote driving apparatus 200. The storage unit 205 is realized by a storage apparatus such as a disk drive (for example, an HDD or an SSD). A communication unit 206 provides a function of the remote driving apparatus 200 communicating with another apparatus (for example, a vehicle to be remotely driven), and is realized by a network card or an antenna, for example.

Figure 3:
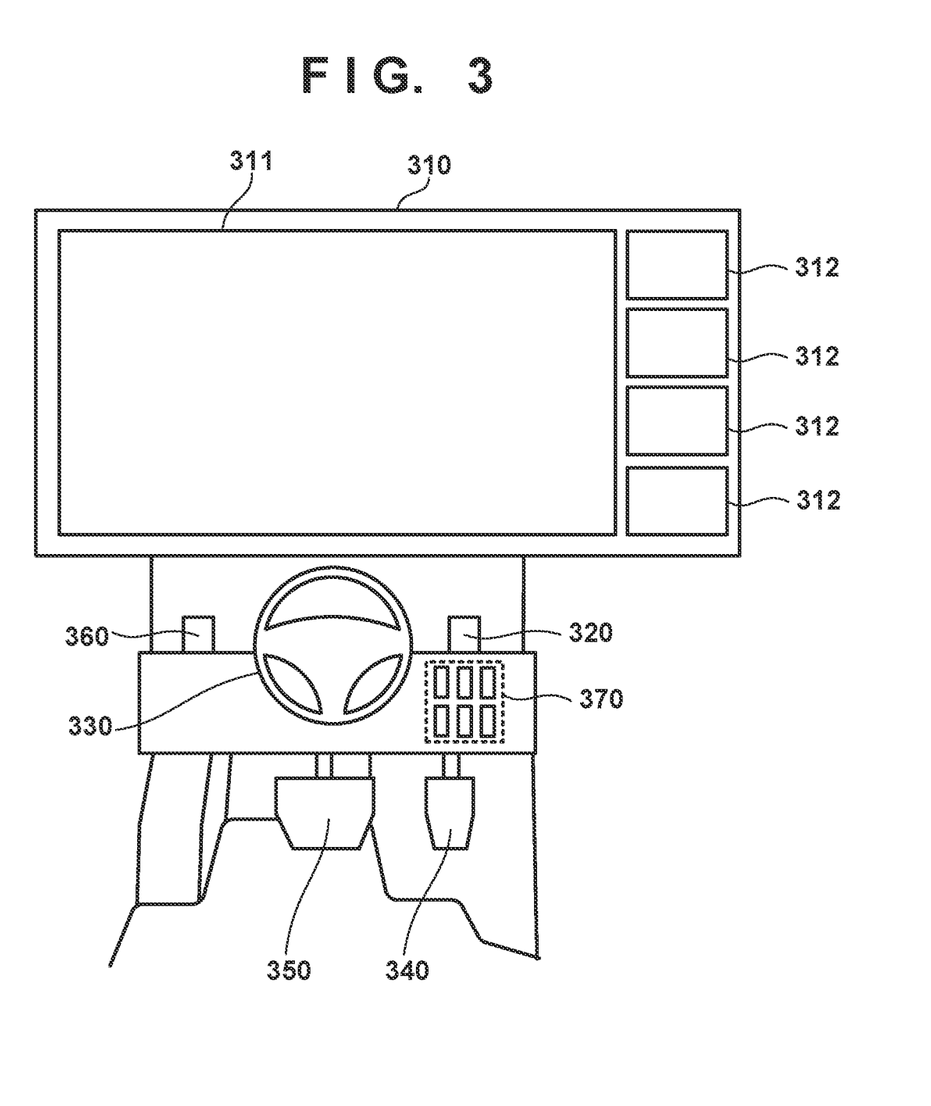
FIG. 3 is a schematic diagram illustrating a console example of remote driving according to an embodiment of the present invention.

A configuration example of the input unit 203 and the output unit 204 of the remote driving apparatus 200 will be described with reference to the schematic diagram in FIG. 3. In this configuration example, the output unit 204 is constituted by a display apparatus 310 and an acoustic apparatus 320, and the input unit 203 is constituted by a steering wheel 330, an accelerator pedal 340, a brake pedal 350, a microphone 360, and a plurality of switches 370.

The display apparatus 310 is an apparatus that outputs visual information for providing the remote driving service. The acoustic apparatus 320 is an apparatus that outputs audio information for providing the remote driving service. A screen displayed on the display apparatus 310 includes one main region 311 and a plurality of sub regions 312. Information regarding a vehicle to be controlled from among a plurality of vehicles to which the remote driving service is to be provided is displayed in the main region 311. The vehicle to be controlled is a vehicle to which an instruction from the remote driving apparatus 200 is transmitted. Information regarding a vehicle other than the vehicle to be controlled from among the plurality of vehicles to which the remote driving service is provided is displayed in each of the sub regions 312. A vehicle other than the vehicle to be controlled may be called a "vehicle to be monitored". When one remote driving apparatus 200 provides the remote driving service to a plurality of vehicles, the operator switches a vehicle displayed on the main region 311 (i.e., the vehicle to be controlled) as appropriate. Information displayed on the main region 311 and the sub regions 312 includes the traffic condition in the surrounding of the vehicle, the speed of the vehicle, and the like.

The steering wheel 330 is used for controlling the steering amount of the vehicle to be controlled, in the leading mode. The accelerator pedal 340 is used for controlling the accelerator pedal position of the vehicle to be controlled, in the leading mode. The brake pedal 350 is used for controlling the brake pedal position of the vehicle to be controlled, in the leading mode. The microphone 360 is used for inputting audio information. Audio information input to the microphone 360 is transmitted to the vehicle to be controlled, and is regenerated in the vehicle.

The plurality of switches 370 are used for inputting various types of instructions for providing the remote driving service. For example, the plurality of switches 370 include a switch for switching the vehicle to be controlled, a switch for performing an instruction of a determination result of the operator in the assisting mode, a switch for switching a plurality of operation modes, and the like.

The remote driving apparatus 200 described with reference to FIGS. 2 and 3 can provide both the leading mode and the assisting mode. Alternatively, the remote driving apparatus 200 can provide only one of the leading mode and the assisting mode. When the leading mode is not provided, the steering wheel 330, the accelerator pedal 340, and the brake pedal 350 can be omitted. In addition, the remote driving service may be provided by a plurality of remote driving apparatuses 200 in cooperation. A configuration may be adopted, in this case, a remote driving apparatuses 200 can take over a vehicle to which the service is to be provided, from another remote driving apparatus 200.

Figure 4:
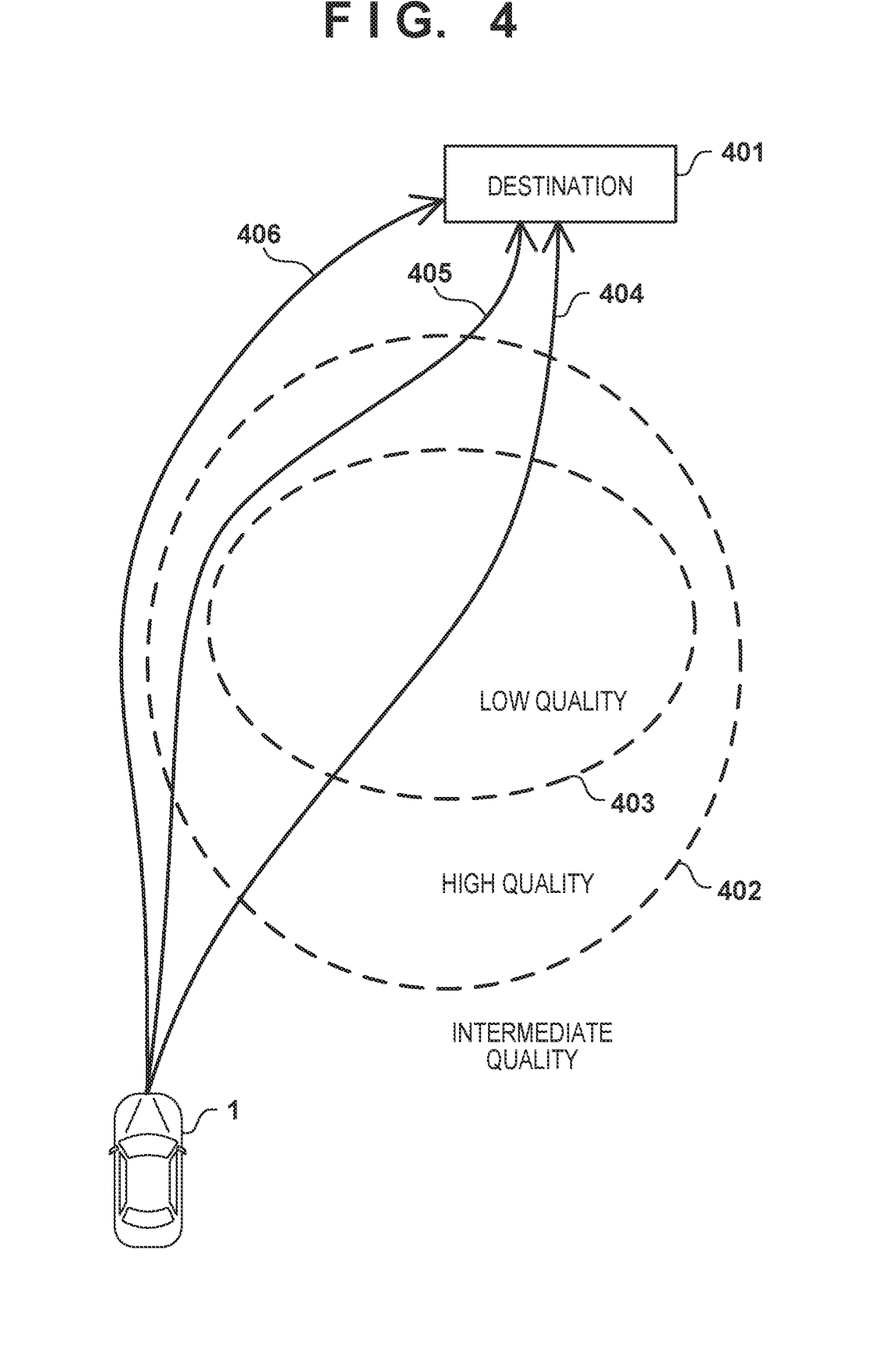
FIG. 4 is a diagram illustrating an example of path setting of a vehicle according to an embodiment of the present invention.

An overview of some embodiments of the present invention will be described with reference to FIG. 4. FIG. 4 shows an actual environment in which the vehicle 1 is present. A destination 401 of running (moving) is set for the vehicle 1. Geographical locations (hereinafter, simply referred to "locations") included in an area extending from the current position of the vehicle 1 to the destination 401 respectively have various communication quality levels. In the embodiment in FIG. 4, communication quality is classified into three stages, namely "high quality", "intermediate quality", and "low quality". Communication quality may be determined based on throughput, may be determined based on delay, or may be determined based on a combination of these. Communication quality in an area outside a broken line 402 in FIG. 4 is as assumed to be "intermediate quality", communication quality in the area between the broken line 402 and a broken line 403 is as assumed to be "high quality", and communication quality in the area enclosed by the broken line 403 is as assumed to be "low quality".

The vehicle 1 can execute various functions in addition to the above-described automated driving function and remote driving function. Functions that can be executed by the vehicle 1 may include, for example, a manual driving function and an IVI (in-vehicle infotainment) function. The manual driving function refers to a function of running the vehicle 1 as a result of the driver of the vehicle 1 manually controlling acceleration/deceleration and steering. A driving assist function may be operated in parallel during manual driving. The IVI function refers to a function of providing entertainment-related data such as music and moving images to a vehicle interior. All of the remote driving function, the automated driving function, the manual driving function, and the IVI function are examples of a function that uses communication with an apparatus outside of the vehicle 1. For example, in the remote driving function, the vehicle 1 transmits, to the remote driving apparatus 200, data regarding the vehicle and an object in the surroundings of the vehicle, and receives an operation instruction from the remote driving apparatus 200. In the automated driving function, the vehicle 1 receives data regarding an object in the surroundings of the vehicle 1 from an apparatus installed on infrastructure such as a road monitoring camera. The data from the apparatus installed on infrastructure can also be used in the manual driving function. In the IVI function, data of music and/or moving images is received from an apparatus that provides a distribution service. The vehicle 1 that is executing an individual function is expressed as "vehicle 1 in an operation mode for the individual function". For example, the vehicle 1 that is executing the remote driving function is expressed as "the vehicle 1 in a remote driving mode". In the remote driving mode and an automated driving mode, a passenger (driver) of the vehicle 1 does not drive the vehicle 1. On the other hand, in a manual driving mode, a passenger (driver) of the vehicle 1 drives the vehicle 1.

There are cases where a function that uses communication with an apparatus outside the vehicle cannot operate satisfactorily, depending on the quality of communication between this apparatus and the vehicle 1. In view of this, the vehicle 1 (specifically, the control apparatus 2 of the vehicle 1) sets a path of the vehicle 1 so as to satisfy a requirement of communication quality. The control apparatus 2 that executes a path setting operation can be called a "path setting apparatus". Quality levels required for executing respective functions are managed using a required quality table 500 shown in FIG. 5, for example. The required quality table 500 is created by a driver, an automobile manufacturer, or the like in advance, and is stored in the memory 20b of the vehicle 1, for example.

Figure 5:
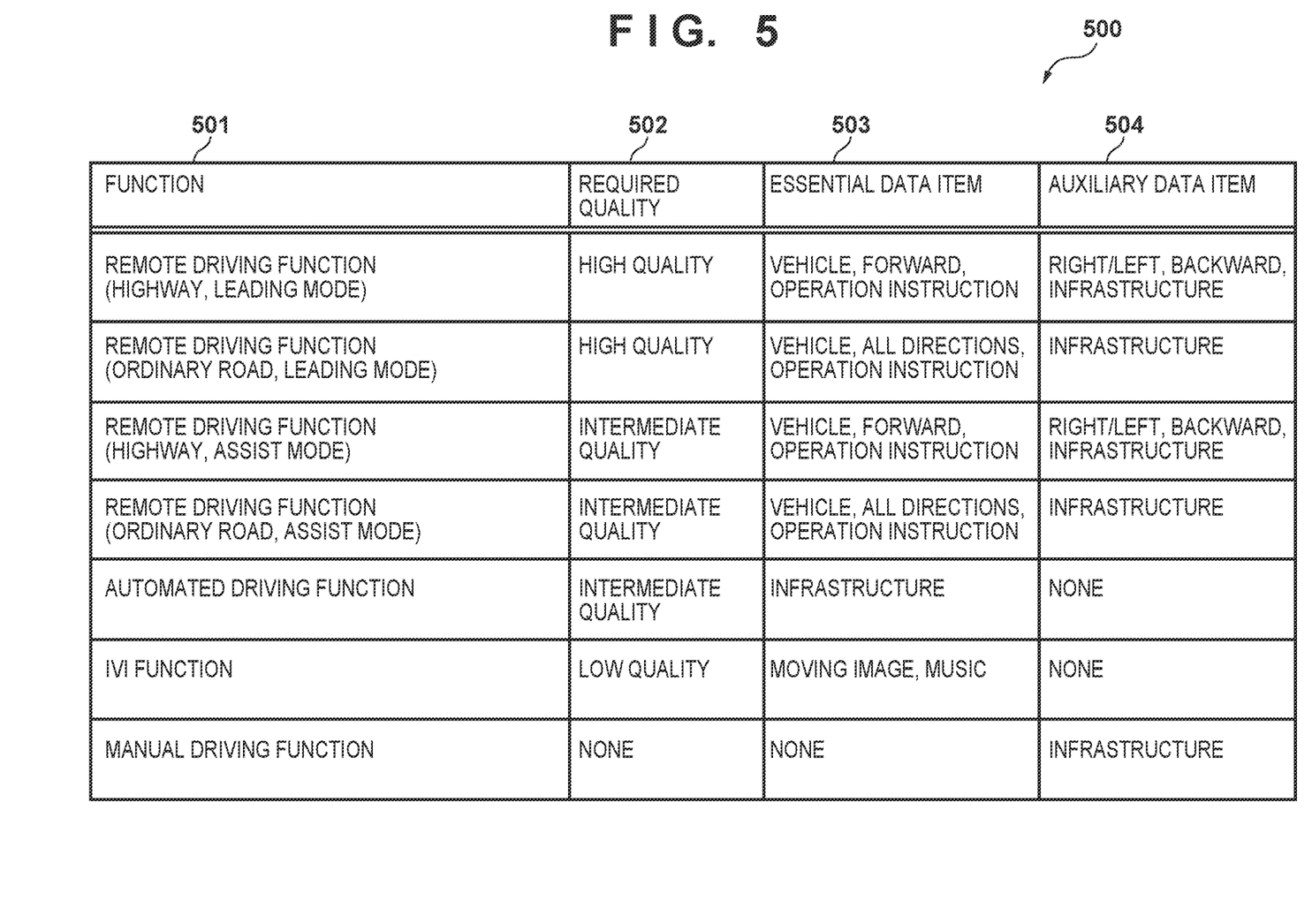
FIG. 5 is a diagram illustrating an example of a required quality table according to an embodiment of the present invention.

The required quality table 500 in FIG. 5 will be described. A column 501 represents functions that use communication. Required communication quality and essential data items for the remote driving function are different according to the situation of a planned path of the vehicle 1 and an operation mode, and are thus individually determined for each case. The situation of a planned path of the vehicle 1 includes a type of road, a type of traffic participant, and a degree of congestion, for example. In the following description, a type of road will be handled as the situation of a planned path. A type of road may be a highway, a toll ordinary road, or an ordinary road. A toll ordinary road may be handled similarly to a highway, and thus an ordinary road and a highway are handled as a type of road. An ordinary road is an example of a road that a pedestrian is allowed to enter, and a highway is an example of a road that a pedestrian is prohibited to enter.

A column 502 represents communication quality required for executing a function. A column 503 represents data items essential for executing a function from among data items used for executing the function. A column 504 represents one or more data items not essential for executing a function (i.e. auxiliary data items) from among data items used for executing the function.

A case will be described in which the remote driving function is executed in the leading mode in a situation in which the vehicle 1 is running on a highway. Essential data items when the remote driving function is executed in this situation and this operation mode are transmission of information regarding the vehicle itself, transmission of information regarding an object in front of the vehicle, and receiving of an operation instruction. If at least one of these is missing, the vehicle 1 cannot execute the remote driving function. Auxiliary data items when the remote driving function is executed in this situation and this operation mode are transmission of information regarding objects to the left/right of and behind the vehicle and receiving of data from an infrastructure apparatus. If at least one of these is missing, the vehicle 1 can execute the remote driving function in a range where such information is not used. For example, without information regarding objects to the left/right of and behind the vehicle, the vehicle 1 only accepts control of acceleration/deceleration from the operator of the remote driving apparatus 200, and performs steering using the automated driving function. When the remote driving function is executed in the leading mode when the vehicle 1 is running on a highway, there is demand that essential data items can be transmitted with high quality.

A case will be described in which the remote driving function is executed in the leading mode in an environment in which the vehicle 1 is running on an ordinary road. Unlike a case of a highway, there is the possibility that a pedestrian is present, and thus transmission of information regarding objects to the right/left of and behind the vehicle are set as essential data items. When the remote driving function is executed in the assist mode, there is demand that essential data items can be transmitted with intermediate quality. In the assist mode, it is possible to keep running the vehicle using the automated driving function, and thus delay that is larger than that in the leading mode is allowed in communication between the vehicle 1 and the remote driving apparatus 200.

A case will be described in which the vehicle 1 executes the automated driving function. In this case, an essential data item is data from infrastructure, and there is demand that this data can be transmitted with intermediate quality. The manual driving function makes it possible to keep running the vehicle without using communication, and thus there is no essential data item, and no required quality is determined accordingly. Essential data items for the IVI function are moving images and music, large delay does not affect running, and thus required quality is low quality.

An overview of a path setting method that is performed by the control apparatus 2 will be described with reference to FIG. 4 again. When the vehicle 1 is in the manual driving mode, required quality of the vehicle 1 is low quality. Therefore, the control apparatus 2 sets a path (for example, a path 404) without selection of a path being restricted depending on communication quality. The path 404 passes through an area of high-quality, an area of intermediate quality, and an area of low-quality.

When the vehicle 1 is in the remote driving mode and the assist mode, required quality of the vehicle 1 is intermediate quality. Therefore, the control apparatus 2 sets a path (for example, a path 405) so as to not pass through an area of low-quality.

It is assumed that there are a relatively large number of communication apparatuses in the area of high-quality between the broken line 402 and the broken line 403, and if a communication service is provided to a larger number of communication apparatuses than that, there is a risk that the communication quality will decrease. In this case, the control apparatus 2 of the vehicle 1 in the manual driving mode may set a path (for example, a path 406) so as to not pass through an area in which there is a risk that the quality will decrease. Accordingly, another vehicle can pass through this area in an operation mode in which high-quality communication is required.

Figure 6:
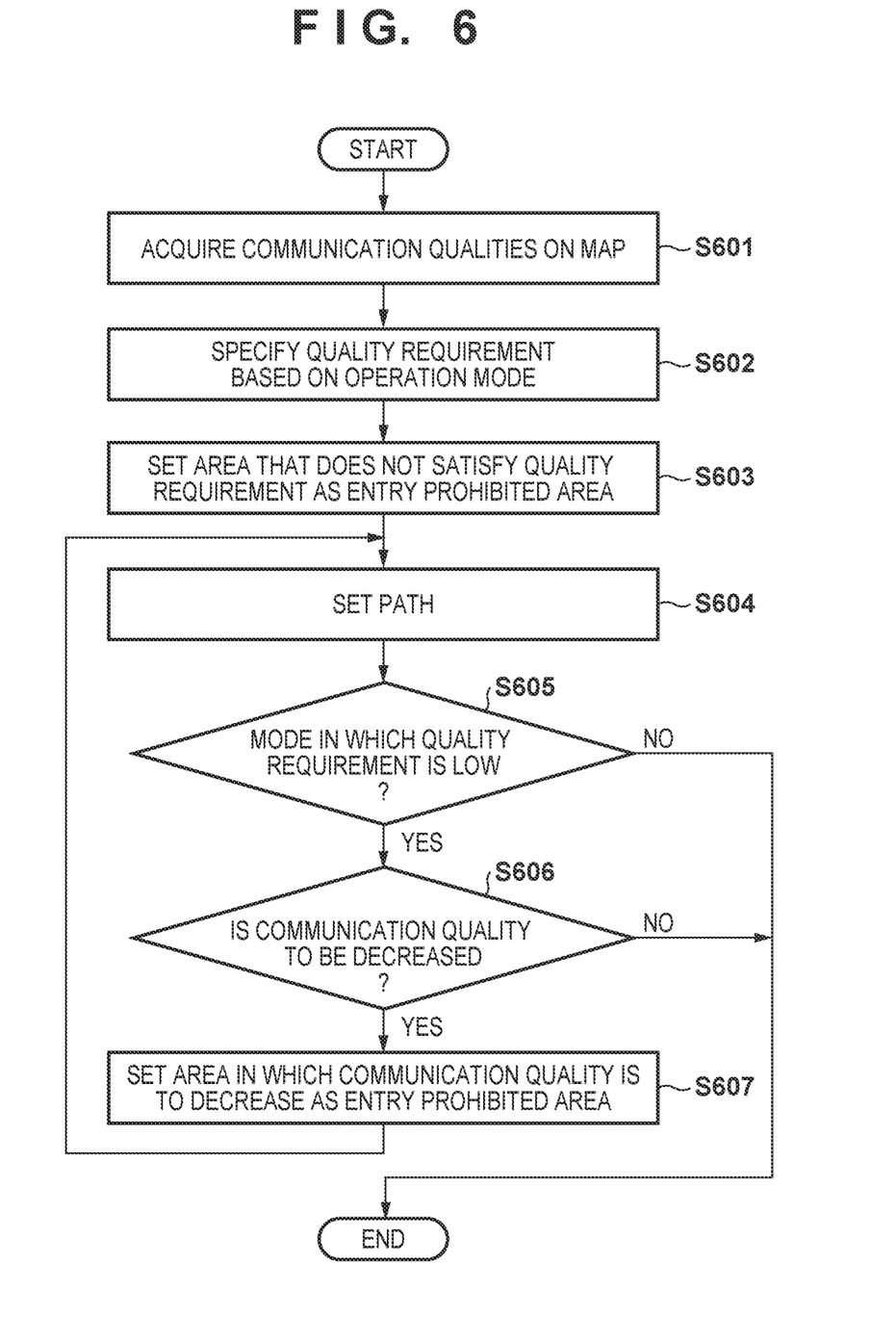
FIG. 6 is a flowchart illustrating an example of a path setting method according to an embodiment of the present invention.

An example of a path setting method that is performed by the vehicle 1 will be described with reference to FIG. 6. This method may be performed as a result of a processor (for example, the processor 20a) of the vehicle 1 executing a program stored in a memory (for example, the memory 20b). Alternatively, some or all of the processes of the method may be executed by a dedicated circuit such as an ASIC (application specific integrated circuit). In the former case, the processor serves as a constituent element for a specific operation, and, in the latter case, the dedicated circuit serves as a constituent element for a specific operation. The control method in FIG. 6 is executed, for example, in response to a destination having been set for the vehicle 1, and/or in response to the operation mode of the vehicle 1 having been changed.

In step S601, the vehicle 1 acquires communication qualities at a plurality of geographical locations in a region that includes the current position and a destination. A communication quality may be a communication quality at a time point when step S601 is executed, or a communication quality at a time when the vehicle 1 is expected to arrive at each position. A communication quality may also be the quality of communication between the vehicle 1 and a communication partner. If there are different communication partners for respective functions, the vehicle 1 may acquire a communication quality for each of the communication partners. Alternatively, the vehicle 1 may acquire the quality of communication between the vehicle 1 and a serving wireless base station, as a communication quality to be assigned to all of the functions. The vehicle 1 may transmit/ receive test data to/from a communication partner in order to acquire a communication quality, or may specify the communication standard (3G, 4G, 5G, etc.) that is being used by the vehicle 1. In addition, the vehicle 1 may also inquire the communication network about communication qualities at respective locations in order to acquire communication qualities. A configuration may also be adopted in which the communication network inquires terminal apparatuses positioned at respective locations about communication quality, and responds to the vehicle 1 based on the result.

In step S602, the vehicle 1 acquires the current operation mode of the vehicle 1. Furthermore, the vehicle 1 specifies communication quality required for the current operation mode of the vehicle 1 by referencing the required quality table 500.

In step S603, the vehicle 1 sets an area that does not satisfy the quality requirement as an entry prohibited area. For example, when the operation mode of the vehicle 1 is the automated driving mode, required quality is intermediate quality, and thus an area of low-quality is set as an entry prohibited area.

In step S604, the vehicle 1 sets a path of the vehicle 1 so as to pass an area that satisfies the requirement of communication quality determined in step S603 according to the operation mode. Specifically, the vehicle 1 sets a path so as to not pass through the entry prohibited area set in step S603. As a result, when the vehicle 1 is in an operation mode in which low quality is set as a requirement (for example, the manual driving mode), a path that passes through an area in which the communication quality is low compared with an operation mode in which high quality is set as a requirement (for example, the remote driving mode) is set.

In step S605, the vehicle 1 determines whether or not the operation mode of the vehicle 1 is an operation mode in which the communication requirement is lower than a threshold. If the operation mode of the vehicle 1 is an operation mode in which the communication requirement is lower than the threshold ("YES" in step S605), the vehicle 1 advances the procedure to step S606, and otherwise ("NO" in step S605), the vehicle 1 ends the procedure. The threshold is set on a boundary between the intermediate quality and the low quality, for example. In this case, if the vehicle 1 is in an operation mode in which the quality requirement is high quality and intermediate quality, the procedure ends, and if the vehicle 1 is an operation mode in which the required quality is low quality, step S606 is executed.

In step S606, the vehicle 1 determines whether or not there is an area in which the communication quality is expected to decrease if the vehicle 1 runs on the path set in step S604. If there is such an area ("YES" in step S606), the vehicle 1 advances the procedure to step S607, and otherwise ("NO" in step S606) the vehicle 1 ends the procedure.

In step S607, the vehicle 1 sets an area in which the communication quality is expected to decrease as an entry prohibited area, and sets a path again in step S604. In this step, a path that does not pass through the area in which the communication quality is expected to decrease is set.

In the above embodiment, a case has been described in which the vehicle 1 (specifically, the control apparatus 2 of the vehicle 1) sets a path of its own. Alternatively, one path setting apparatus may also set paths respectively for a plurality of vehicles. Such an embodiment will be described below. In the embodiment below, paths of a plurality of mobile bodies are adjusted relative to each other based on requirements of communication quality of a plurality of vehicles.

Figure 7:
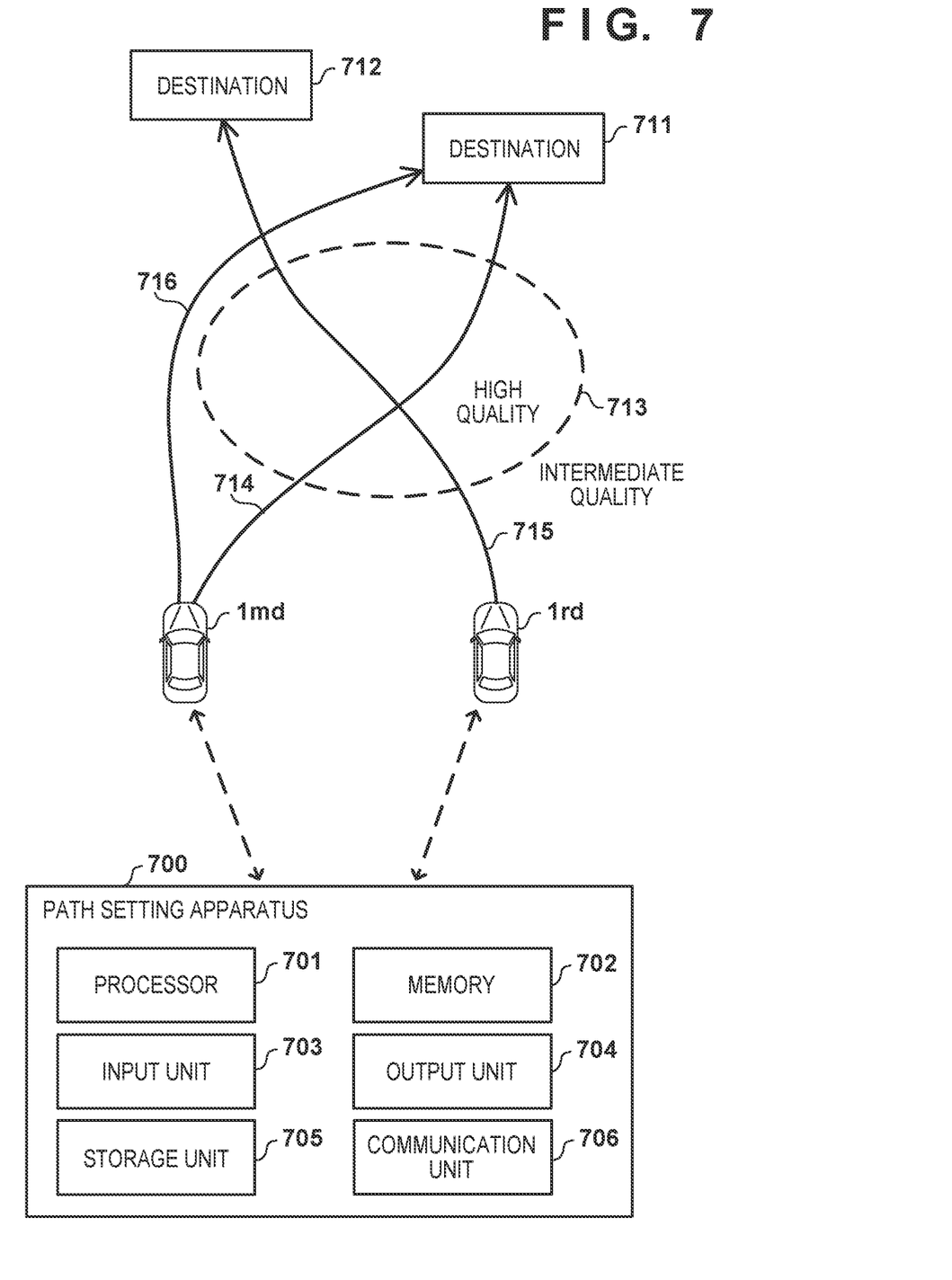
FIG. 7 is a diagram illustrating a configuration example of a path setting apparatus according to an embodiment of the present invention.

FIG. 7 shows a configuration example of a path setting apparatus 700 that sets paths respectively for a plurality of vehicles. The path setting apparatus 700 includes, for example, a processor 701, a memory 702, an input unit 703, an output unit 704, a storage unit 705, and a communication unit 706. The processor 701, the memory 702, the input unit 703, the output unit 704, the storage unit 705, and the communication unit 706 may be respectively equivalent to the processor 201, the memory 202, the input unit 203, the output unit 204, the storage unit 205, and the communication unit 206 of the remote driving apparatus 200 that have been described with reference to FIG. 2, and thus a redundant description thereof is omitted. The path setting apparatus 700 communicates with a plurality of vehicles 1. From among the plurality of vehicles 1, a vehicle 1 in the remote driving mode is denoted by a vehicle 1rd, and a vehicle 1 in the manual driving mode is denoted by a vehicle 1md.

An example of a path setting method that is performed by the path setting apparatus 700 will be described with reference to FIG. 8. This method may be performed as a result of the processor 701 of the path setting apparatus 700 executing a program stored in the memory 702. Alternatively, some or all of the processes of the method may be performed by a dedicated circuit such as an ASIC (application specific integrated circuit). In the former case, the processor serves as a constituent element for a specific operation, and, in the latter case, the dedicated circuit serves as a constituent element for a specific operation. The control method in FIG. 8 is executed in response to a destination having been set for one of a plurality of vehicles for which paths are to be set, and/or in response to the operation mode of one of the plurality of vehicles having been changed.

Figure 8:
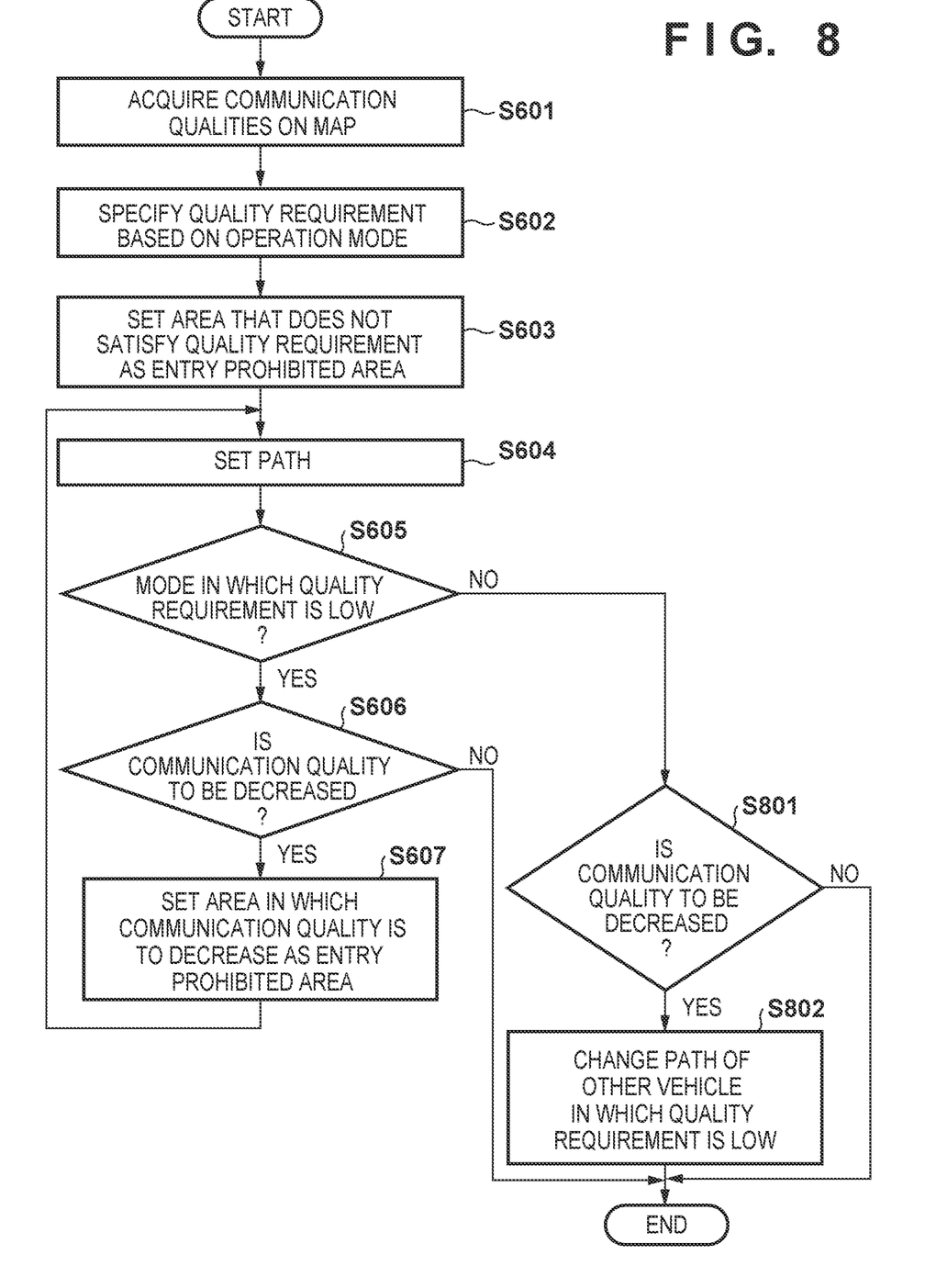
FIG. 8 is a flowchart illustrating an example of a path setting method according to an embodiment of the present invention.

Since steps S601 to S607 in FIG. 8 are similar to those in FIG. 6, the same reference signs are assigned, and a redundant description thereof is omitted. In step S602, the path setting apparatus 700 acquires the operation mode of a vehicle 1 by receiving the operation mode from the vehicle 1. In step S604, the path setting apparatus 700 sets a path of the vehicle 1, and then transmits this path to the vehicle 1. The path setting apparatus 700 may transmit the set path to the vehicle 1 on the condition that the method in FIG. 8 has completed.

In step S605, if the operation mode of the vehicle 1 is not an operation mode in which the communication requirement is lower than a threshold ("NO" in step S605), the vehicle 1 advances the procedure to step S801. In step S801, path setting apparatus 700 determines whether or not there is an area in which the communication quality is expected to decrease if the vehicle 1 runs on the path set in step S604. If there is such an area ("YES" in step S801), the path setting apparatus 700 advances the procedure to step S802, and otherwise ("NO" in step S801) the path setting apparatus 700 ends the procedure.

In step S802, the path setting apparatus 700 changes a path, of a vehicle from among a plurality of vehicles for which a path is to be set, that passes through an area in which the communication quality is expected to decrease, and in which the quality requirement is lower than the threshold, so as to not pass through that area.

A specific scenario of the setting method in FIG. 8 will be described with reference to FIG. 7 again. Assume that a destination 711 is set for the vehicle 1md, and then a destination 712 is set for the vehicle 1rd. In addition, assume that the communication quality in an area enclosed by a broken line 713 is high quality, and the communication quality in an area outside the broken line 713 is intermediate quality.

First, the path setting apparatus 700 sets a path 714 for the vehicle 1md according to the destination 711 having been set for the vehicle 1md. Next, the path setting apparatus 700 sets a path 715 for the vehicle 1rd according to the destination 712 having been set for the vehicle 1rd. Here, since both the vehicle 1md and the vehicle 1rd commonly pass through an area inside the broken line 713 as a result of executing step S801, the path setting apparatus 700 estimates that the communication quality in the area will decrease. In view of this, the path setting apparatus 700 prioritizes the path 715 of the vehicle 1rd for which a communication requirement is higher than that of the vehicle 1md, and changes the path 714 of the vehicle 1md to a path 716 that does not pass through that area.

In the above embodiment, a path for a vehicle (automobile) is set. Alternatively, a path of a mobile body other than a vehicle may also be set. A path of an uninhabited airborne vehicle (UAV) may also be set, for example.

Overview of Embodiments

Configuration 1

A path setting apparatus (2, 700) that sets a path of a mobile body (1) having a plurality of operation modes, the apparatus comprising:

a quality acquisition unit configured to acquire communication qualities at a plurality of geographical locations (S601); and a setting unit configured to set a path of the mobile body so as to pass through an area that satisfies a requirement of communication quality that is determined according to an operation mode of the mobile body (S604).

According to this configuration, a path of a mobile body can be appropriately set.

Configuration 2

The path setting apparatus according to configuration 1, wherein the mobile body is operable in a first operation mode and a second operation mode in which communication quality that is lower than that of the first operation mode is required, and when the mobile body is in the first operation mode, the setting unit sets a path (405) that passes through an area in which communication quality is high, compared with a case where the mobile body is in the second operation mode.

According to this configuration, an appropriate path can be set for a mobile body that requires high communication quality.

Configuration 3

The path setting apparatus according to configuration 2, wherein, when the mobile body is in the second operation mode, and there is an area in which communication quality is expected to decrease as a result of the mobile body passing through the area, the setting unit sets a path so as to not pass through the area (S606, S607).

According to this configuration, a path can be set in accordance with a change in the communication quality.

Configuration 4

The path setting apparatus according to configuration 1 or 2, wherein the setting unit sets a path for each of a plurality of mobile bodies.

According to this configuration, a path can be appropriately set for each of a plurality of mobile bodies.

Configuration 5

The path setting apparatus according to configuration 4, wherein the setting unit adjusts paths of the plurality of mobile bodies with respect to each other based on requirements of communication quality (502) of the plurality of mobile bodies (S802).

According to this configuration, paths can be more appropriately set for a plurality of mobile bodies.

Configuration 6

The path setting apparatus according to configuration 5, wherein each of the plurality of mobile bodies is operable in at least one of a first operation mode and/or a second operation mode in which communication quality that is lower than that of the first operation mode is required, and the setting unit sets a path with higher priority given to a mobile body in the first operation mode than a mobile body in the second operation mode (S802).

According to this configuration, it is possible to prioritize path setting for a mobile body that requires high communication quality.

Configuration 7

The path setting apparatus according to configuration 6, wherein, when it is expected, as a result of setting paths such that both a first mobile body in the first operation mode and a second mobile body in the second operation mode pass through a common area, that communication quality in the common area will decrease, the setting unit sets a path of the second mobile body such that the second mobile body does not pass through the common area (S802).

According to this configuration, it is possible to suppress a mobile body that requires low communication quality from decreasing the communication quality of the common area.

Configuration 8

The path setting apparatus according to configuration 6 or 7, wherein the first operation mode is a mode in which a passenger of the mobile body does not drive the mobile body, and the second operation mode is a mode in which a passenger of the mobile body drives the mobile body.

According to this configuration, it is possible to prioritize a mode in which a passenger does not drive a mobile body.

Configuration 9

A non-transitory storage medium that stores a program for causing a computer to function as the path setting apparatus according to any one of configurations 1 to 8.

According to this configuration, each of the above configurations can be realized in a form of a storage medium that stores a program.

Configuration 10

A path setting method for setting a path of a mobile body (1) having a plurality of operation modes, the method comprising:

acquiring communication qualities at a plurality of geographical locations (S601); and setting a path of the mobile body so as to pass through an area that satisfies a requirement of communication quality that is determined according to an operation mode of the mobile body (S604).

According to this configuration, a path of a mobile body can be appropriately set.

The invention is not limited to the foregoing embodiments, and various variations/changes are possible within the spirit of the invention.

What is claimed is:

1. A path setting apparatus comprising at least one processor circuit with a memory comprising instructions, that when executed by the at least one processor circuit, cause the at least one processor circuit to at least:

acquire a communication quality at each of a plurality of geographical locations;

set a plurality of different paths for a plurality of mobile bodies to pass through an area that satisfies a requirement of communication quality that is determined according to an operation mode of each of the mobile bodies, each of the plurality of mobile bodies having a plurality of operation modes including a first operation mode in which a passenger of the mobile body does not drive the mobile body and a second operation mode in which a passenger of the mobile body drives the mobile body, the setting of individual ones of the different paths including adjusting the individual ones of the different paths of the plurality of mobile bodies with respect to each other based on requirements of communication quality of the plurality of mobile bodies, prioritizing a mobile body operating in the first operation mode over a mobile body operating in the second operation mode to determine the different paths of the plurality of mobile bodies, and when it is expected, as a result of setting individual ones of the different paths such that both a first mobile body in the first operation mode and a second mobile body in the second operation mode pass through a common area, that a level of communication traffic will exceed a threshold, setting a respective one of the different paths associated with the second mobile body such that the second mobile body does not pass through the common area;

transmit the respective one of the different paths to the second mobile body; and control the second mobile body to follow the respective one of the different paths.

2. The path setting apparatus according to claim 1, wherein the instructions further cause the at least one processor circuit to:

when the mobile body is in the first operation mode, set a path to pass through an area in which a communication quality is at least a first threshold level, and when the mobile body is in the second operation mode, set a path to pass through an area in which a communication quality is at least a second threshold level, the first threshold level being higher than the second threshold level.

3. The path setting apparatus according to claim 2, wherein, when the mobile body is in the second operation mode and there is an area where a level of communication traffic will exceed a threshold as a result of the mobile body passing through the area, the instructions further cause the at least one processor circuit to set a path so as to not pass through the area.

4. The path setting apparatus according to claim 1, wherein the second operation mode requires a communication quality that is lower than the communication quality required by the first operation mode.

5. A non-transitory storage medium that stores a program for causing a computer to function as the path setting apparatus according to claim 1.

6. A path setting method, the method comprising:

acquiring a communication quality at each of a plurality of geographical locations;

setting a plurality of different paths for a plurality of mobile bodies to pass through an area that satisfies a requirement of communication quality that is determined according to an operation mode of each of the mobile bodies, each of the plurality of mobile bodies having a plurality of operation modes including a first operation mode in which a passenger of the mobile body does not drive the mobile body and a second operation mode in which a passenger of the mobile body drives the mobile body, the setting of individual ones of the different paths including adjusting the individual ones of the different paths of the plurality of mobile bodies with respect to each other based on requirements of communication quality of the plurality of mobile bodies, prioritizing a mobile body operating in the first operation mode over a mobile body operating in the second operation mode to determine the different paths of the plurality of mobile bodies, and when it is expected, as a result of setting individual ones of the different paths such that both a first mobile body in the first operation mode and a second mobile body in the second operation mode pass through a common area, that a level of communication traffic will exceed a threshold, setting a respective one of the different paths associated with the second mobile body such that the second mobile body does not pass through the common area; and transmitting the respective one of the different paths to the second mobile body; and controlling the second mobile body to follow the respective one of the different paths.

* * * * *